United States Patent Office 2,927,142
Patented Mar. 1, 1960

2,927,142

COMBINED ELECTRIC ARC AND HYDROCARBON FUEL HEATED METAL MELTING FURNACE AND METHOD OF MELTING THEREWITH

Micheal D. La Bate, Elwood City, Pa., assignor to Ritetherm, Inc., Cleveland, Ohio, a corporation of Ohio Application October 30, 1957, Serial No. 693,282

6 Claims. (Cl. 13—2)

This invention relates to a combined electric arc and hydrocarbon fuel heated furnace for melting metals in which the arc and hydrocarbon fuel can be used individually and concurrently, selectively, and to a method of melting therewith, and more particularly to an electric arc furnace for melting metals in which a fuel burner and pre-combustion chamber are provided for supplying auxiliary heat to the charge during the melting thereof by the electric arc.

One of the principal objects of the present invention is to provide a combined electric and fuel heated furnace without destroying the inherent structure of the carbon arc furnace so that the carbon arc furnace can be used in its customary fashion as well as with the auxiliary heat supplied by hydrocarbon fuel.

Another object is to provide a furnace of this character in which the time required for heating of the charge is greatly reduced with a considerable saving in overall heating expense, the cost of the electric power and the hydrocarbon fuel being substantially below the cost of power for melting the charge entirely by the electric arc or the fuel.

Another object is to provide a combination of this character in which any of the fluid hydrocarbon fuels, such as oil or gas, can be used in combination with the electric arc.

Among the other advantages of the present invention are the facts that the furnace can be kept hot between taps; the slag can be refined after removal of the electrodes by heating it with hydrocarbon fuel and holding it at high temperature for the longer period needed for refinement; the melt can be kept hot for indefinite periods awaiting use; new linings can be "burnt in" more efficiently and with considerably less thermal shock; the melt can be continued without the electrodes in event of power failure so that the necessity for dumping the unfinished charge and danger of freezing of the charge in the furnace due to power failures are eliminated; the preheating of the scrap charge to facilitate melting by the electrodes; the preheating of alloys directly in the furnace preparatory to adding the scrap charge instead of the melting of the alloys separately and adding them to the charge; the melting of iron economically; and the obtaining of these advantages in an electric arc furnace without detracting from the capability of the furnace to perform strictly its original function as an electric arc furnace.

Various other objects and advantages of the present invention will become apparent from the following description wherein reference is made to the drawings, in which:

Fig. 4 is an enlarged vertical sectional view through a burner used for the burning of hydrocarbon fuels in the present combination; and Fig. 5 is a side elevation of a gas nozzle which may be substituted for the oil nozzle of the burner illustrated in Figs. 1 through 3.

Figure 1:
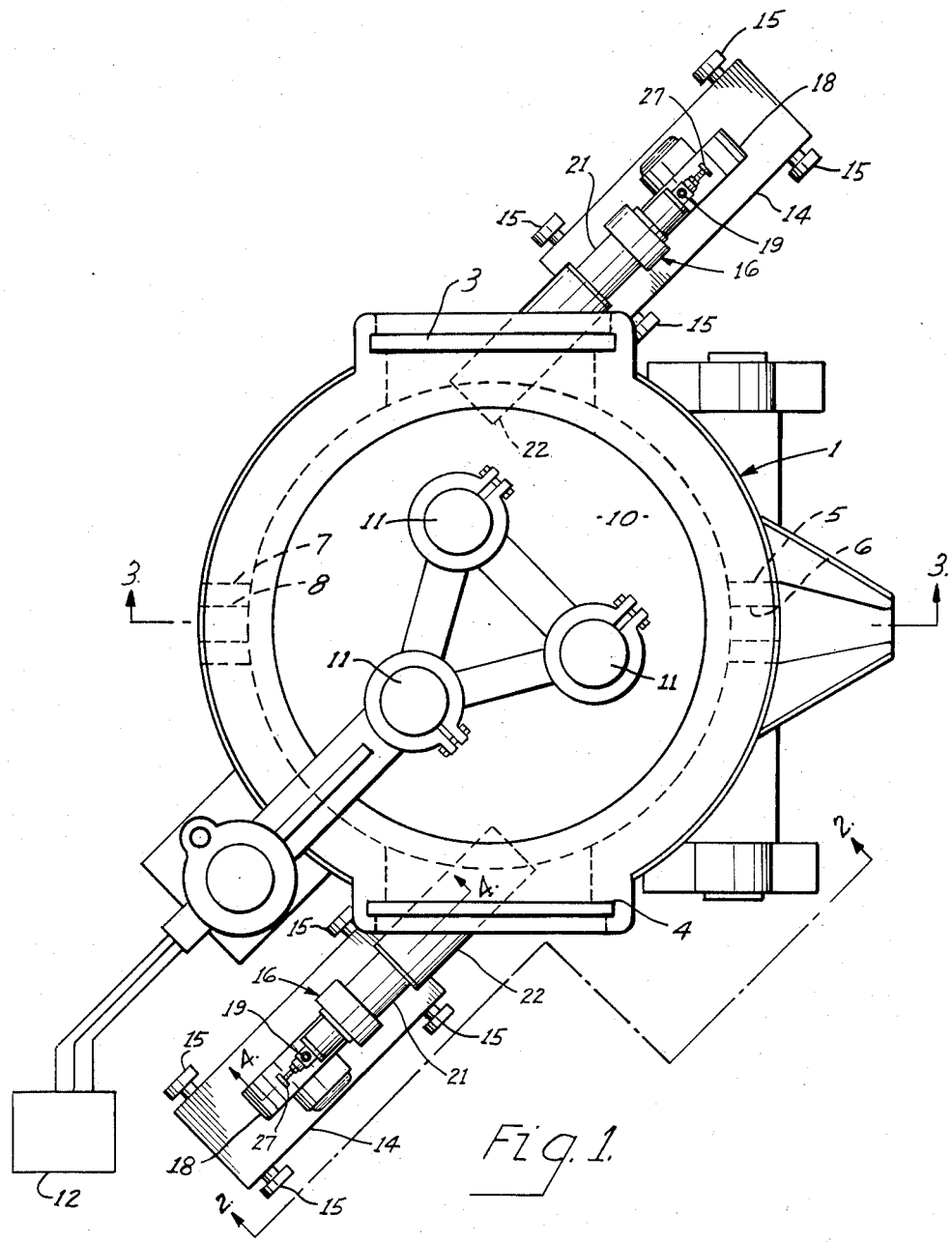
Fig. 1 is a diagrammatic top plan view illustrating a conventional form of carbon-electrode-arc furnace for melting metals, with the auxiliary heating means of the present invention combined therewith.
Figure 2:
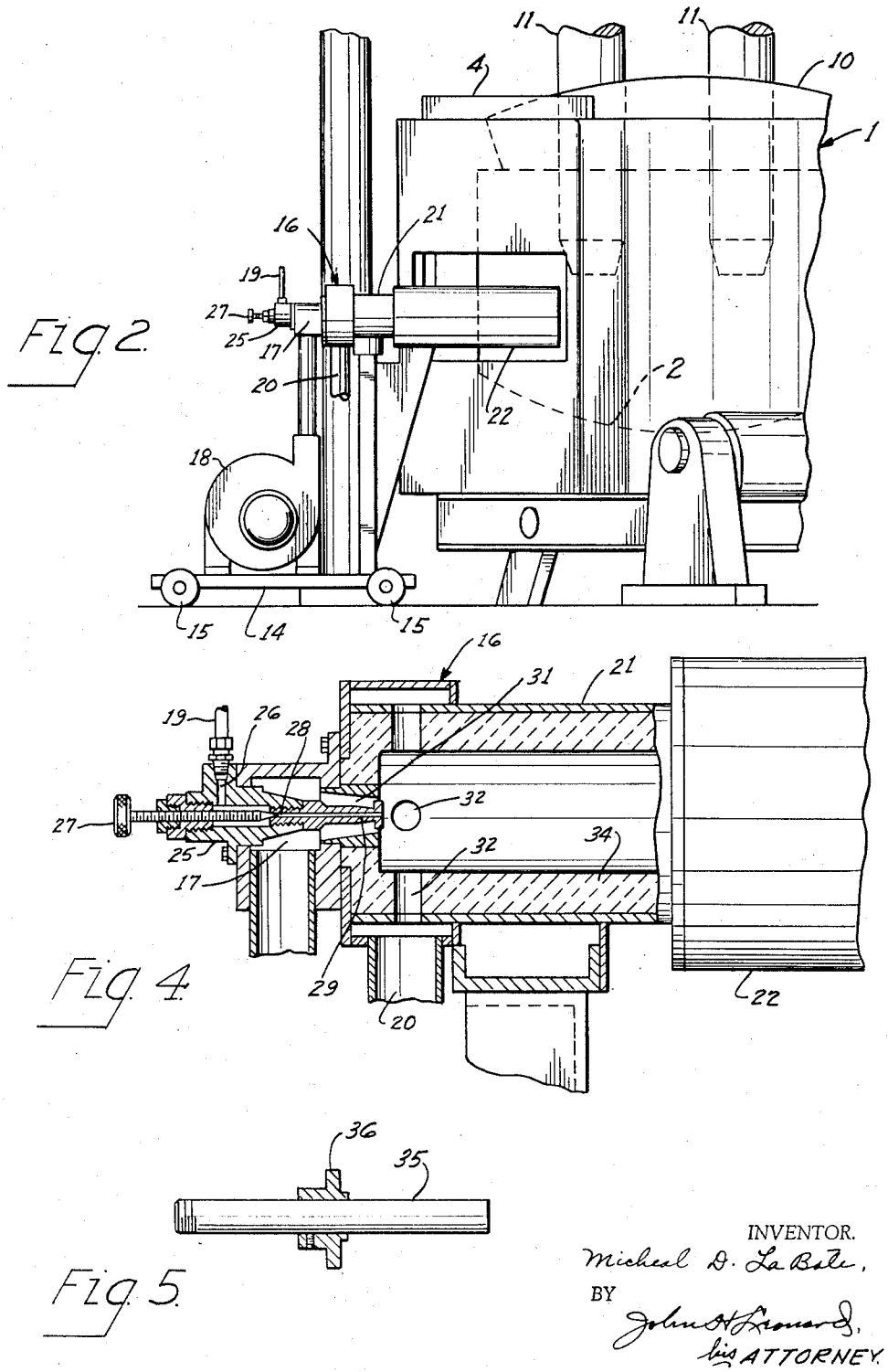
Fig. 2 is a front elevation of the structure illustrated in Fig. 1.

Heretofore attempts have been made to provide a combination of this character but it has been found that, in general, the burners were not of a type which could provide a sufficiently great heat to make any substantial differences in operation or in the power costs and time required for heating the charge.

In accordance with the present invention, a special burner is provided which is characterized particularly in that it can deliver heat through a combustion or radiant chamber into the furnace at a temperature sufficient in and of itself to melt ordinary iron, with fuels such as the conventional illuminating gas or the conventional household heating oils.

The burner must be one capable in and of itself of providing temperatures of from 2700° F. to 3150° F. with combustion products containing a negligible amount of oxygen in combinations which can combine with the charge.

Referring to the drawings, the furnace comprises the conventional tilt-type metal shell 1 having a spherical bottom lined with fire brick, as indicated at 2, in which the molten metal accumulates. The furnace has suitable side doors 3 and 4 affording access to the interior thereof. In addition, it is provided with a front closure 5 having a sprue hole 6 through which the molten metal can be tapped when desired, and a rear closure 7 having a sprue hole 8 through which the slag can be tapped off.

As is customary in furnaces of this character, the shell is supported on suitable trunnions or runners so that it can be tilted forwardly and rearwardly for discharging the molten metal from the sprue 6 and the slag from the sprue 8. Generally, such furnaces are charged from the top or through an upper charging door. The top is covered by a removable closure cap 10 which supports the electrodes 11 for movement vertically to different adjusted positions. Conventional means are provided for adjusting the electrodes in accordance with the demands of the charge. The electrodes 11 are preferably three in number and are arranged for use with a three-phase source of power from a transformer 12, one electrode to each phase. The arcs are drawn between the charge and electrodes and, when drawn, are maintained during the melt for heating the charge.

Figure 3:
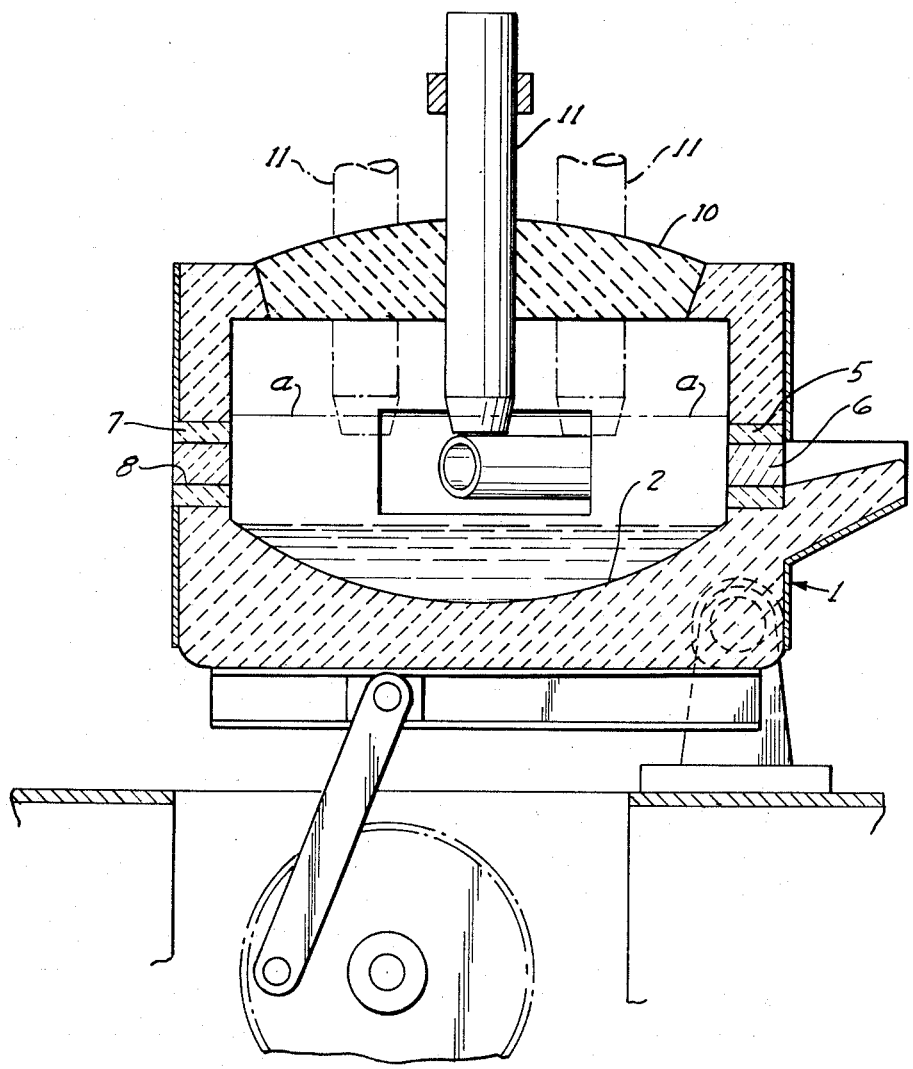
Fig. 3 is a vertical sectional view taken on the plane indicated by the line 3—3 in Figs. 1 and 2.

Ordinarily, the metal is charged into the furnace to an upper level from above the lower ends of the electrodes, as indicated by the line a in Fig. 3 to a lower level just below the doors 3 and 4, the molten bath collecting in the spherical bottom of the furnace. The structure thus far described is a conventional carbon electrode electric arc furnace and the details thereof in and of themselves are well known in the art. Normally, the heat of the arcs melts out the center of the charge, causing the portion of the charge against the side wall of the furnace to fall inwardly and become directly subjected to the arcs.

In accordance with the present invention, auxiliary heating means employing hydrocarbon fuel are provided, the auxiliary heating means being arranged to discharge burning products of combustion into the interior of the furnace through the side doors 3 and 4 thereof, and thus into the portion of the charge of metal which is being melted by the arc but which is, as yet, unmelted.

As illustrated in the drawing, the auxiliary heating means are arranged so that they may readily be moved into position for use in combination with the furnace, or withdrawn from operating position, so that the furnace can be utilized strictly as an electric arc furnace as originally designed.

Preferably, one auxiliary heating means is provided for each side door. The auxiliary heating means are arranged to discharge into the furnace generally circumferentially thereof and along the furnace side wall 1, each in the same direction about the upright axis of the melting chamber. This arrangement tends to cause the auxiliary heat to wash the entire outer surface of the unmelted charge.

Since the auxiliary means are identical, one only is described in detail.

A suitable auxiliary heating means comprises a truck 14 provided with wheels 15 by which it can be moved toward and away from the furnace. Supported on the truck is a burner 16 to which primary air is supplied through a primary air housing 17 from a motor-driven blower 18. Fuel is supplied to the burner under pressure through a flexible fuel line 19, and secondary air is induced into the burner through a conduit 20.

The burner is provided with a pre-combustion chamber 21 which discharges into a radiant tube or combustion chamber 22. For conventional electric arc furnaces of larger sizes, the auxiliary heating means is one capable of supplying about 70,000,000 B.t.u.'s per hour from hydrocarbon fuel, such as illuminating gas or fuel oil. The blower, of course, is of adequate size to supply the primary air necessary for the combustion of the fuel supplied by the burner. For example, in the illustrative showing, the combustion chamber 22 may comprise, in general, a refractory radiant firing tube which may be about four feet long and from 22 to 32 inches in outside diameter, with an inside diameter of from 16 to 28 inches.

The burner itself preferably is one such as is more fully described in U.S. Patents 2,532,592; 2,532,851; and 2,646,376, and which is illustrated in Fig. 4 hereof. As here illustrated, the burner has a body 25 into which fuel oil is fed under pressure through an opening 26, and from which it discharges under the control of a needle valve 27 cooperating with an orifice 28. A suitable duct 29 leads from the orifice and discharges into the pre-combustion or explosion chamber 21.

Primary air is supplied through the inlet 17 and passes through an induction air nozzle 31 which is in coaxial surrounding relation to the end of the body 25 through which the duct 29 discharges. Preferably, the discharge outlet of the nozzle 31 and of the duct 29 are coplanar. The pre-combustion chamber 21 is provided just in front of the plane of the discharge end of the nozzle 31 with a plurality of secondary air inlets 32 through which secondary air may be drawn or blown into the interior of the pre-combustion chamber 21.

The pre-combustion chamber 21 is lined with a refractory lining 34 which may, as described in the above patents, be a catalyst for the combustion of the fuel. The pre-combustion or explosion chamber 21 discharges into the radiant tube or combustion chamber 22.

Burners of the character described appear to operate by virtue of an explosion in the pre-combustion chamber which ejects the fuel forcibly into the combustion chamber, wherein, due to the pre-explosion, and possibly to the catalyst, it appears to burn extremely effectively with little objectionable oxygen content by the time it discharges from the combustion chamber, and with an intense heat sufficient in and of itself to melt ordinary iron and maintain a molten bath thereof in the furnace, usually from 2700° F. to 3150° F., using conventional fuel oil or illuminating gas. In Fig. 5, there is shown a gas nozzle which may be substituted for the fuel oil discharging mechanism of the burner. Instead of the body 25, and the parts connected thereto, the gas burning nozzle 35 is installed within the primary air housing 17 with its discharge end at the plane of the discharge end of the nozzle 31, a suitable flange 36 being provided on the gas nozzle for connection to the jacket of the secondary air inlet housing.

It has been found that, with this combination and method, a considerable saving in the time required for heating a charge, as compared with the time required for heating the same charge solely by the electric arcs themselves, is obtained, this time being as much as one hour. Furthermore, there is a saving in the overall cost of heating, the cost of the power used for the arcs plus the cost of the heat supplied by the hydrocarbon fuel together totaling less than the cost of the power that would be required for heating comparably solely by the electric arcs.

In addition, there is greater flexibility in operation inasmuch as the slag can be refined after removal of the electrodes by continuing to heat it for a long period with the hydrocarbon fuel. It can be heated thus to a high temperature and held at that temperature.

The present burner is adequate to keep the molten charge hot awaiting use after the discontinuance of the electric arc heating. It has been found also that in burning in new linings advantages are obtained in that the heat can be brought up much more gradually without any charge in the furnace, or with a charge in the furnace, by means of the auxiliary heating means and hydrocarbon fuel, whereas, in burning in new linings with an electric arc and a full charge, intense heat with resultant severe thermo-shocks necessarily occur.

Another advantage resides in the fact that when a melt is started, it can be continued despite power failures which may occur for various reasons, and thus the charge does not have to be dumped to prevent freezing in the furnace with the well-known difficulties of removal.

The scrap charge which is fed into the furnace can be preheated in the furnace to facilitate its melting by the electrodes and the unmelted part of the charge near the side walls of the furnace can be brought up to temperature rapidly before the arcs can become fully effective thereon.

In those cases in which alloys are to be made, the alloy materials can be melted in the present instance in the furnace by the auxiliary burner preparatory to adding the scrap charge, instead of being melted separately and added, as is now the practice. For the lower melting point irons and the like, the furnace can be used for batch meltings without the use of the electrodes but solely by the burner itself.

Since the burner is mobile, it may be shifted to different positions so as to direct its flame to the part of the charge desired from time to time. This compensates for varying compactness and density in different parts of the charge and eliminates both cold spots and damage to the furnace lining due to direct impingement of the flame resulting from burning through the charge when the flame is concentrated in one place.

It is to be noted that all fuel is supplied through the burner and is supplied with only enough oxygen for its combustion. Preferably it is natural gas, illuminating gas, or coke oven gas. No solid hydrocarbon fuel, such as coal, coke, and the like, is mixed with the charge as these would require the admission of such amounts of oxygen in such a manner that oxidation of the charge and damage to the electrodes would result. All fuel introduced must be introduced through a combustion chamber which assures that the products discharged into the furnace do not contain appreciable oxygen in a state which will oxidize the charge.

It has been found that, with the present structure, a charge of ordinary carbon steel scrap can be melted in the furnace with the burner, using natural gas, without supplementing the burner heat with the electric arcs.

It is apparent, therefore, that by the combination herein described, numerous advantages are obtained.

Having thus described my invention, I claim:

1. An electric arc furnace comprising a refractory lined shell providing a melting chamber having a bottom wall and a side wall, and constructed to contain a charge of metal to be melted, electrodes disposed in the chamber in spaced relation above the bottom wall and in inwardly spaced relation to the side wall, and operable to produce an electric arc in a charge contained in the chamber in spaced relation to the side wall, transformer means constructed for connection to a source of power for supplying electric power to said electrodes for producing arcs for melting the charge, and said shell having an opening at least on one side at a level at which the unmelted charge is located, auxiliary hydrocarbon fuel burning means arranged to discharge into the chamber into the unmelted charge near the side wall and generally circumferentially of the chamber and in and of itself to produce a temperature of at least 2700° F., said means including a burner, means to supply fluid hydrocarbon fuel to the burner, means to supply primary air under pressure to the burner, a pre-combustion chamber for the burner in which said air and fuel mixture is exploded prior to discharge, a radiant refractory lined combustion chamber arranged to receive at one of its ends the products discharged by the pre-combustion chamber, and to discharge at its opposite end into the chamber.

2. The structure according to claim 1 characterized in that the opening in the wall of the electric arc furnace is the side door of the furnace.

3. The structure according to claim 1 characterized in that the pre-combustion chamber of the burner is lined with a material which is catalytic with respect to the combustion of the fuel and air mixture discharged by the burner.

4. The structure according to claim 1 characterized in that at least two of said auxiliary heating means are provided and they are spaced apart from each other peripherally of the chamber, and both discharge in the same circumferential direction in the chamber.

5. The method of melting metal, comprising disposing a charge of metal in a melting chamber of a refractory melting furnace, subjecting the lateral midportion of the metal charge to electric arcs for melting the same and concurrently discharging a burning hydrocarbon fuel and air mixture at a temperature in excess of 2700° F. against the periphery of the charge in a direction generally circumferentially of the charge for melting the outer periphery of the charge concurrently with the melting of the central portion of the charge by the electric arcs.

6. An electric arc furnace comprising a refractory lined shell providing a melting chamber having a bottom wall and a side wall and constructed to contain a charge of metal to be melted, electrodes disposed in the chamber in spaced relation above the bottom wall and in inwardly spaced relation to the side wall, and operable to produce an electric arc in a charge contained in the chamber in spaced relation to the side wall of the chamber, transformer means constructed for connection to a source of power for supplying electric power to said electrodes for producing arcs for melting the central portion of the charge, said shell having an opening at least on one side at a level at which the unmelted charge is located, auxiliary hydrocarbon fuel burning means arranged to discharge into the chamber into the periphery of the unmelted charge near the side wall and generally circumferentially of the chamber at a plurality of locations spaced apart from each other circumferentially of the chamber, and said fuel burning means being operable to produce a temperature of at least 2700° independently of the temperature produced by the electrodes.

References Cited in the file of this patent

UNITED STATES PATENTS

| Re. 16,149 | Southgate | Aug. 25, 1925 |
| 1,084,991 | Wills | Jan. 20, 1914 |
| 1,587,197 | Southgate | June 1, 1926 |